Figure 1:
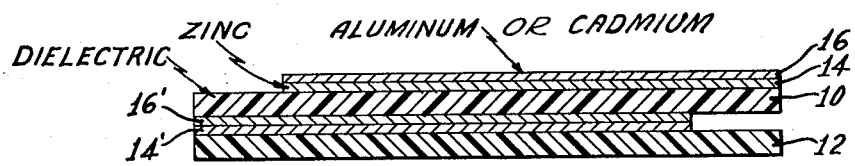

April 20, 1965  W. DUBILIER  3,179,862

DUAL-FILM METALLIZED CONDENSERS

Filed Sept. 9, 1960

INVENTOR.
WILLIAM DUBILIER

BY
Paul S. Martin
ATTORNEY 3,179,862
DUAL-FILM METALLIZED CONDENSERS
William Dubilier, New Rochelle, N.Y., assignor to Cornell-Dubilier Electric Corporation, a corporation of Delaware
Filed Sept. 9, 1960, Ser. No. 54,926
3 Claims. (Cl. 317—258)

The present invention relates to metallized-dielectric condensers.

A widely used type of condenser includes two metallized strips of very thin dielectric material, wound into a compact condenser. The dielectric may be a strip of paper, or of a suitable plastic, and in any event it is extremely thin. Where paper has been used, it is commonly coated with lacquer before metallizing to minimize the possibility of short-circuiting. Additional strips of dielectric material, not metallized may be included for higher voltage ratings. Metallized-electrode condensers have the desirable quality of being self-healing, both in the process of manufacture and, subsequently, when in use.

Aluminum is widely used for metallizing. Zinc has been recognized as being distinctly superior, from the point of view of self-healing property. In the event that a fault should develop, electrical energy applied during manufacture or in operation causes the zinc to vaporize with a minimum of local deterioration of the dielectric and with a minimum of "balling" of the metallized layer in the area of the fault.

The advantages of zinc metallizing are sacrificed, and other metals have been used in its place, because of the tendency of zinc-metallized condensers to have higher internal loss than in the case of aluminum-metallized condensers.

An object of the present invention is to provide improved condensers utilizing zinc-metallizing.

In accordance with the present invention, the attractive self-healing characteristics of zinc are retained, without suffering the companion disadvantages of zinc mentioned above. As will be seen, the illustrative embodiment of the invention utilizes zinc as a metallized layer in adherent contact with the dielectric, and a protective metal cover is deposited as a metallic film over the zinc. With this arrangement, zinc is the only metal that could enter any fissures or pin holes in the dielectric. Similarly zinc is the only metal that is directly exposed to any microscopic foreign particle of metal that might be present in the dielectric at isolated points. Fault-current that flows at such flaws acts to vaporize the zinc and thus heals the capacitor. The protective film of metal is so extremely thin as not to obstruct this self-healing action. The preferred metal for this protective metallized layer is aluminum, although cadmium is a suitable substitute. This layer is thus separated from direct contact with the flaw but it thus acts effectively to inhibit deterioration of the zinc layer.

Figure 2:
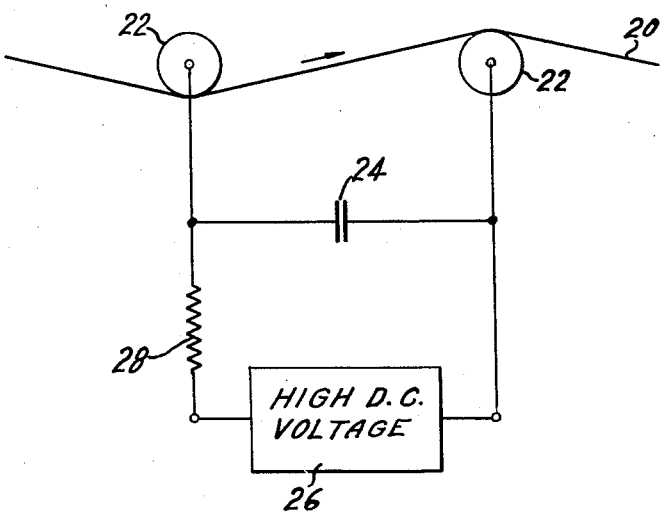

The nature of the invention and its other features and advantages will be more fully apparent from the following detailed description, which is illustrated in the annexed drawings. In those drawings:

FIGURE 1 is a greatly enlarged cross-section of two layers of a condenser embodying features of the present invention; and FIGURE 2 is a schematic diagram of apparatus employed in clearing faults of material in FIGURE 1.

Referring now to the drawings, FIGURE 1 shows two layers or convolutions of a wound metallized condenser, including elongated dielectric strips 10 and 12 which appear in transverse cross-section. These strips may be of paper, or a plastic. There is a film of zinc 14 on dielectric strip 10. A protective film 16, preferably aluminum, covers the zinc. Films 14 and 16 are applied by the usual vacuum-depositing techniques. Film 14 is extremely thin, as in conventional for metallized zinc electrodes of condensers. Film 16 is preferably thinner, of minimum thickness consistent with the purpose of providing a reasonably continuous protective coating over the zinc. The thickness of zinc film 14 may be somewhat thinner than in conventional metallized-electrode films, to allow for the added metal of the protective film. Similarly, dielectric layer 12 has its films 14' of zinc and 16' of aluminum. Advantageously, both films may be applied successively in a single pass through the vacuum apparatus. The capacitance between the composite electrode 14', 16' on dielectric substrate 12 relative to composite electrode 14, 16 on dielectric substrate 10 is determined by the spacing and the constant of the interposed dielectric layer and by the opposed areas of the electrodes. Terminal connection to the upper electrode 14, 16 may be made at the right-hand extremity of the unit and connection to the lower electrode 14', 16' may be made at the left-hand edge of the assembly illustrated in any customary manner.

It should be understood that the cross-section shown is an elemental portion of a much larger wound capacitor, formed by winding two strips of metallized dielectric so as to have numerous convolutions. Conventional impregnating materials are used to fill the voids between the convolutions and in the dielectric strata; and additional layers of dielectric material (not metallized) may be utilized to supplement the single layers 10 and 12 illustrated.

There may be localized flaws in the dielectric layer 10. This could result in a breakdown between the electrodes 14, 16 and 14', 16'. To avoid this, the material used in winding such a condenser can be subjected to a fault-clearing treatment before use in winding a condenser. Suitable apparatus for this is illustrated in FIGURE 2. A strip of material 20 is shown in FIGURE 2, which represents one of the metallized dielectric strips in FIGURE 1. This material passes metal roller 22. A condenser 24 is connected between these rollers, this condenser having a source of high-voltage direct current 26 connected to it via resistor 28. In the event that a flaw should be present, the high-voltage energy in condenser 24 discharges in a path which includes both of the metal rollers 22, the metallized layer on one side of strip 20, and (through the fault) to the other metallized roller. The zinc in the immediate region of the flaw or immediately surrounding the flaw quickly vaporizes and thus clears the fault. The fault-clearing process is not seriously affected by the extremely thin protective coating on the zinc, and the desirable fault-clearing properties of zinc are thus retained.

After the strip of metallized dielectric 20 has been thus treated, it is wound into a capacitor together with a second similar strip. The wound capacitor is suitably impregnated, terminals are suitably applied, and the unit is enclosed in a conventional protective coating or container.

Both during the manufacturing operations and in the subsequently completed condenser, the zinc is guarded against deterioration by the aluminum protective film on one surface, and at the opposite surface exposure of the zinc to the atmosphere is minimized by all-over contact with the dielectric layer. This is commonly a varnish coating on paper; or in other applications it may be a layer of a suitable plastic.

The foregoing represents a description of the presently preferred embodiment of the invention. However, it is readily apparent that variations and substitutions will readily occur to those skilled in the art, and consequently the appended claims should be broadly construed.

Having thus described my invention, what I claim as new and desire to secure by Letters Patent is:

1. In an electrical condenser, a pair of wound strips of metallized dielectric, the metallizing comprising a zinc film directly on the dielectric and an aluminum film directly on the zinc.

2. An electrical self-healing condenser, including suitable layers of dielectric with interposed metallic layers insulated from each other by the dielectric layers, at least one of said metallic layers being in the form of a metallized film of zinc on a dielectric layer, and a protective metallized film on said zinc of a metal of the group consisting of aluminum and cadmium.

3. An electrical condenser including at least one strip of dielectric material, a vapor-deposited film of zinc on said dielectric material, and a protective vapor-deposited film of aluminum of minimum thickness covering said zinc.

References Cited by the Examiner
UNITED STATES PATENTS

| 2,689,805 | 9/24 | Croze et al. | 317—258 X |
| 2,887,649 | 5/59 | Peck | 317—258 |

FOREIGN PATENTS

| 722,635 | 1/35 | Great Britain. |
| 722,636 | 1/35 | Great Britain. |
| 768,366 | 2/57 | Great Britain. |

JOHN F. BURNS, *Primary Examiner.*

SAMUEL BERNSTEIN, E. JAMES SAX, *Examiners.*